United States Patent

Conaway et al.

[11] Patent Number: 5,957,231
[45] Date of Patent: Sep. 28, 1999

[54] VEHICLE CAB SUSPENSION UNIT

[75] Inventors: Richard L. Conaway, Grand Haven, Mich.; Douglas G. Stuyvenberg, Milwaukee, Wis.

[73] Assignee: Applied Power Inc., Butler, Wis.

[21] Appl. No.: 09/058,464

[22] Filed: Apr. 10, 1998

Related U.S. Application Data

[60] Provisional application No. 60/044,997, Apr. 28, 1997.

[51] Int. Cl.⁶ ................................................ B62D 33/063
[52] U.S. Cl. ..................... 180/89.14; 180/89.13; 180/89.16; 267/140.11; 296/35.1; 296/190.06; 296/190.07
[58] Field of Search .......................... 180/89.12, 89.13, 180/89.16, 89.14, 89.15; 296/35.1, 190.05, 190.06, 190.07; 267/140.11, 140.13

[56] References Cited

U.S. PATENT DOCUMENTS

| | | | |
|---|---|---|---|
| 3,944,017 | 3/1976 | Foster | 180/89 |
| 4,989,684 | 2/1991 | Conaway | 180/89.15 |
| 5,109,939 | 5/1992 | Conaway et al. | 180/89.15 |
| 5,176,417 | 1/1993 | Bauer | 292/201 |
| 5,209,316 | 5/1993 | Bauer | 180/89.14 |
| 5,253,853 | 10/1993 | Conaway et al. | 267/256 |
| 5,579,860 | 12/1996 | Halverson et al. | 180/89.14 |

OTHER PUBLICATIONS

Applicant's Exhibit 1, Power–Packer, a Unit of Applied Power Inc., CabCushion™ Air Cab Suspension Product Catalog, dated Jul. 1996.

*Primary Examiner*—Eric D. Culbreth
*Attorney, Agent, or Firm*—Quarles & Brady

[57] ABSTRACT

A vehicle cab suspension unit has a foundation which is secured to an outer rail of the frame of the vehicle and pivotally connects one end of a track arm. The other end of the track arm is supported above the foundation by an air spring, and a cab support yoke is pivotally connected between the ends of the track arm so as to support and secure the cab at a position along the track arm between its ends. Shock absorbers are provided between the foundation and the cab support yoke on both sides of the track arm. A height control valve maintains the height of the suspension unit and elastomeric snubbers on the foundation provide limits to the range of travel of the unit.

12 Claims, 2 Drawing Sheets

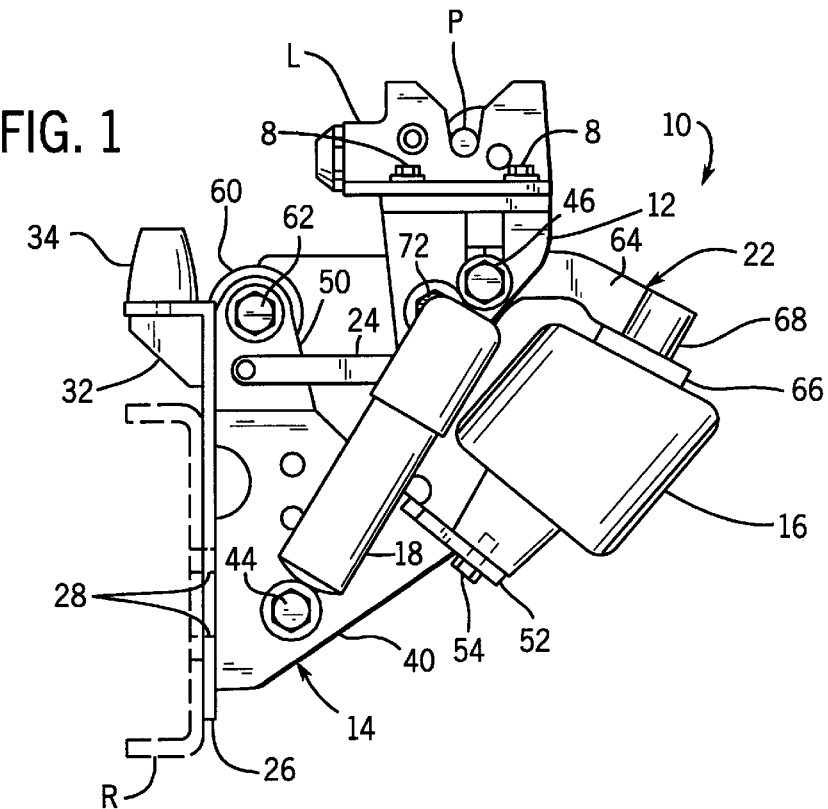
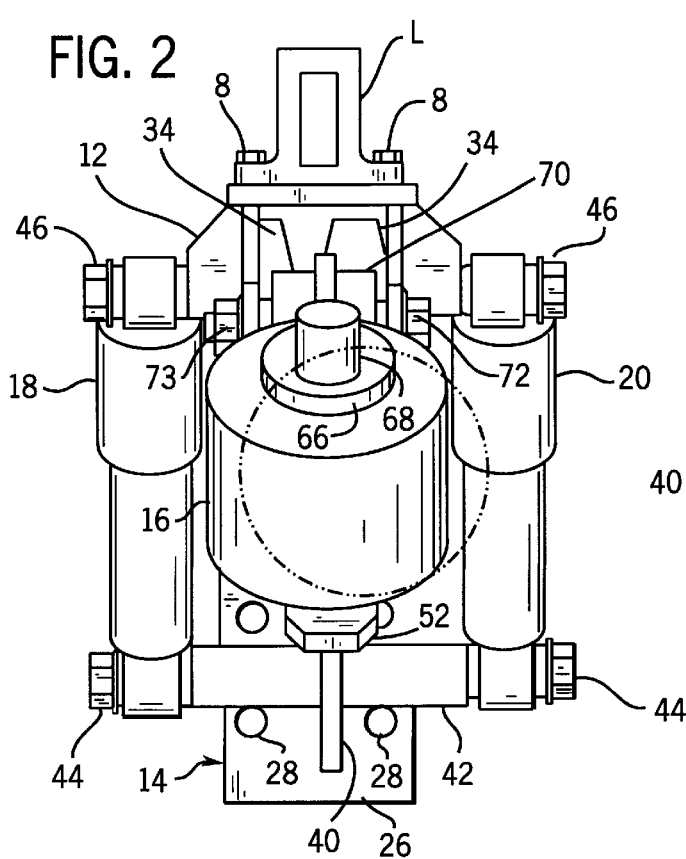

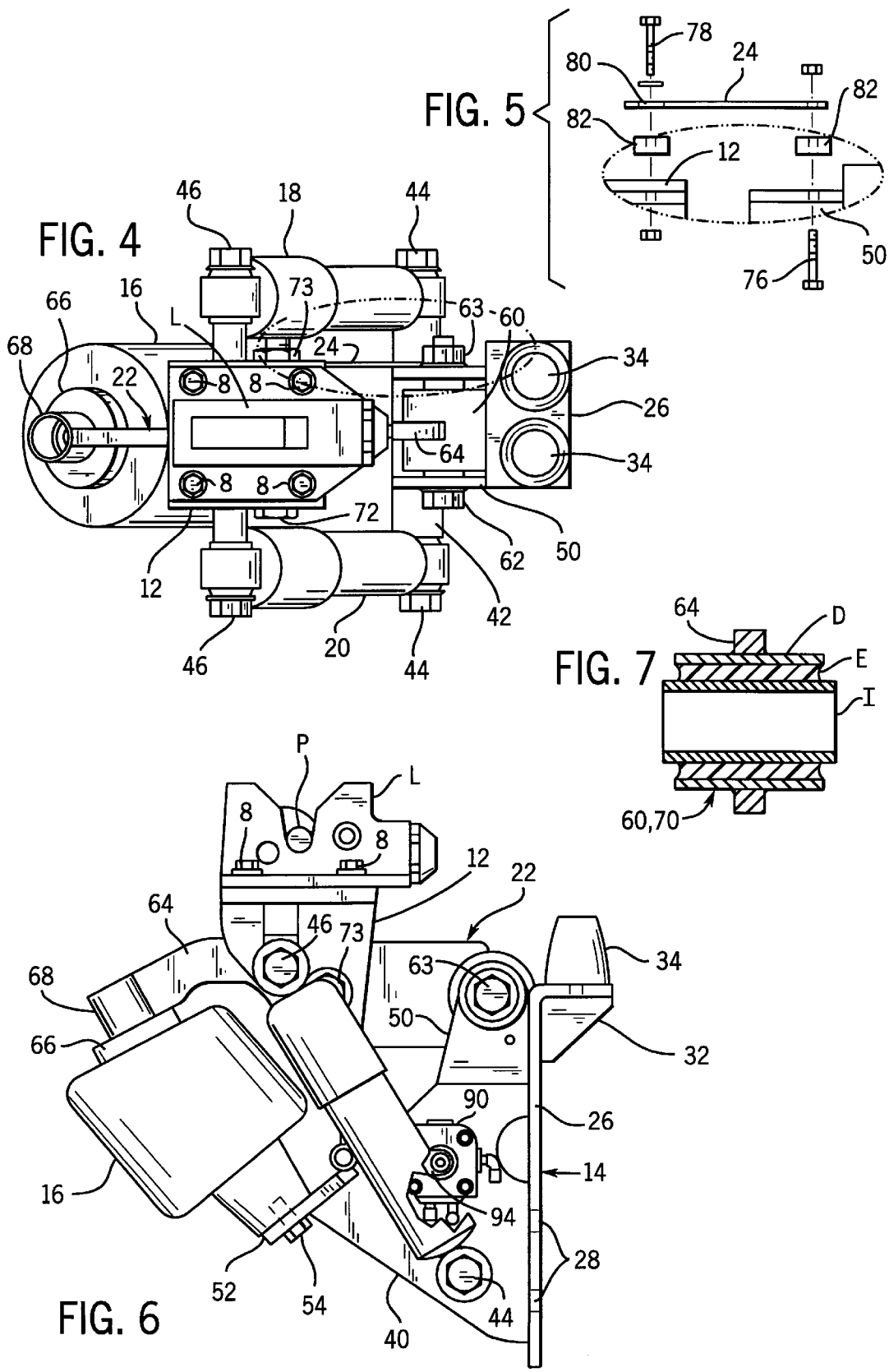

VEHICLE CAB SUSPENSION UNIT

This claims the benefit of the filing date of prior U.S. patent application Ser. No. 60/044,997, filed Apr. 28, 1997, entitled "Vehicle Cab Suspension Unit".

BACKGROUND OF THE INVENTION

1. Field of the Invention

This invention relates to suspension units of the type for supporting a tilt cab of a vehicle on the frame of the vehicle, and in particular to such a unit for supporting the rear portion of a cab in which the cab is pivotally mounted to the frame near the front.

2. Discussion of the Prior Art

In tilt cab trucks, such as over-the-road and yard trucks, the cab is typically mounted at its front to the frame using anti-vibration bushings and the rear of the cab is supported on the frame by a suspension unit which includes one or more springs, typically air springs controlled by a height control valve. The unit is usually damped by one or more shock absorbers. Such suspension units are disclosed, for example, in U.S. Pat. Nos. 4,989,684; 5,109,939; 5,209,316 and 5,253,853.

U.S. Pat. No. 5,579,860 discloses a three-point cab mounting system which is especially adapted for a yard truck of the type which has the center of gravity of the cab offset to one side of the center of the truck frame. The front of the cab is pivotally mounted to the frame with anti-vibration bushings and a single cab suspension unit, which is bolted to the outside of one of the side rails of the frame of the vehicle, supports the rear of the cab. The present invention is directed to a vehicle cab suspension unit which is specially, although not exclusively, adapted to be used in such a three-point cab mounting system.

It has been common in prior cab suspension units for the spring of the suspension unit to support the entire weight of the cab, including the operator and any items placed in the cab. Thus, for sufficient capacity, it has been necessary to use two air springs, or if only one was used, that it be capable of bearing the entire load of the cab. Therefore, it is an object of the invention to provide a suspension unit which can utilize lower capacity springs.

In addition, it is advantageous in vehicle suspension units to orient the air springs at an angle so as to lower their natural frequency. In a three-point system, in which the suspension unit is mounted to the outside of a frame rail and the connection to the cab is made outside of the frame rail, how an air spring could be mounted at an angle in a suspension unit has not been obvious. For example, in the first embodiment of the suspension unit disclosed in U.S. Pat. No. 5,579,860, the load bearing element, which is a marshmallow isolator, has its axis oriented vertically. In the embodiments of FIGS. 7A–C, a suspension unit of a type which is commercially available from the assignee of the present patent is disclosed as an alternative, although this unit employs two angled air springs which together support the full weight of the rear of the cab. It is therefore a relatively large suspension unit and is not particularly adapted for a side mount application, with limited space available for the suspension unit and so as to impart certain stabilizing forces to the cab.

SUMMARY OF THE INVENTION

The invention provides a vehicle cab suspension unit of the above-described type in which the suspension includes a track arm having one end pivotally connected to the frame, an opposite end supported by an air spring and in which the cab is supported at a position on the track arm which is between its ends. Therefore, part of the weight of the cab on the track arm is born by the air spring and part is born by the pivot connection to the frame. Therefore, a lower capacity air spring is needed, which permits a single air spring to be used in the suspension unit.

In a preferred form, the track arm runs laterally, so that the pivot axis at its one end which is pivoted to the frame runs longitudinally relative to the vehicle. The track arm, therefore, helps support the cab laterally with a relatively rigid connection. In another preferred form, the track arm is connected to the cab, or to a latch which is rigidly connected to the cab, by a pivot connection. Preferably, this pivot connection is provided by an anti-vibration bushing of the type which has an inner tube, an outer tube, and a tubular body of vibration-absorbing elastomer between the inner and outer tubes and bonded on its inside and outside faces to the inner and outer tubes. Such an anti-vibration bushing is also preferred for the end of the track arm which is pivotally connected to the vehicle frame. An alignment link may be provided for holding the latch in an orientation to engage with the cab during periods when the cab is disengaged from the latch.

In a form of the invention in which it is particularly adapted to a three-point mounting system, the end of the track arm, which has the pivot connection, is pivotally-connected to a bracket, and the bracket is bolted or otherwise securely affixed to the outer side of one of the longitudinal outside frame rails of the vehicle.

In another preferred aspect, the air spring is angled so as to reduce its natural frequency. It is also preferred that the unit incorporate two shock absorbers, one on each side of the track arm, and that the shock absorbers also be angled relative to the vertical direction. The air spring and the shock absorbers are all angled in a lateral plane in the preferred form of the invention, which is adapted to a three-point cab mounting system.

These and other advantages of the invention will be apparent from the detailed description and drawings.

BRIEF DESCRIPTION OF THE DRAWINGS

FIG. 1 is a front plan view of a vehicle suspension unit of the invention shown together with a latch and pin for securing the cab (not shown) to the suspension unit and illustrating in phantom a side rail of the vehicle to which the unit would be bolted;

FIG. 2 is a side plan view of the unit of FIG. 1, also showing the latch;

FIG. 3 is a detail view of the area of FIG. 2 illustrated by a circle in phantom and with the air spring and track arm removed so as to illustrate details of a height control valve and connecting arm;

FIG. 4 is a top plan view of the unit of FIG. 1, also illustrating the latch;

FIG. 5 is a detail view of the portion of FIG. 4 identified with a phantom oval and with parts removed to show a linkage arm and connectors at the ends of the arm;

FIG. 6 is a rear plan view of the suspension unit of FIG. 1 shown with a part of the rear shock absorber broken away so as to illustrate the height control valve; and FIG. 7 is a cross-sectional view of an anti-vibration bushing of the type which is incorporated at an end and at an intermediate position of the track arm for the suspension unit of FIG. 1.

DETAILED DESCRIPTION OF THE PREFERRED EMBODIMENTS

FIG. 1 illustrates a vehicle suspension unit 10 of the invention shown in the position it would be in looking at it from the front of a vehicle with it mounted to the outer side of longitudinally running outside frame rail R (shown in phantom) of the vehicle. Also shown in FIG. 1 is a latch L of the type described in U.S. Pat. No. 5,176,417, which is bolted by bolts 8 to the top of a yoke shaped cab support 12 of the unit 10. FIG. 1 also illustrates a catch pin P which would be secured to the cab (not shown) and is releasably attached by the latch L. Although the latching mechanism, including the latch L and pin P, are illustrated in FIG. 1, the suspension unit 10 could be used with any type of latching mechanism, or other means of attachment, for securing the cab to the cab support 12.

The unit 10 includes a foundation bracket 14 which mounts the unit 10 to the outside frame rail R and provides points of attachment for the lower ends of an air spring 16 and a pair of hydraulic shock absorbers 18 and 20. The foundation 14 also provides points of pivotal attachment for a track arm 22 and a linkage arm 24.

The foundation 14 has a base plate 26 with holes 28 for bolting the foundation 14 to the frame rail R. The upper end of base plate 26 is bent inwardly and reinforced by a spaced pair of gussets 32, one below each elastomeric snubber 34 which act as relatively soft bumpers for the cab to stop against should the compression limit of the suspension unit 10 be reached.

The foundation 14 also has a generally central and laterally oriented mounting plate 40 which is welded or otherwise securely affixed to the base plate 26. A tube 42, which has its opposite ends internally threaded, extends through and is welded to the mounting plate 40, and bolts 44 are screwed into the tube 42 to mount the lower ends of the shock absorbers 18 and 20. The upper ends of shock absorbers 18 and 20 are mounted by respective bolts 46 in internally-threaded holes of the cab support 12.

A clevis 50 is welded to the upper end of the mounting plate 40 and to the base plate 26. An air spring mounting plate 52 is welded to the outer end of the mounting plate 40, and a bolt 54 extends through the plate 52 and is threaded into the lower end of the air spring 16 to mount the lower end of the air spring 16. As is common for mounting shock absorbers 18 and 20, the upper and lower ends of the shock absorbers 18 and 20 are pivotally mounted by the bolts 44 and 46.

The track arm 22 has its laterally inward end pivotally mounted between the legs of the clevis 50 by a bolt 62 and nut 63. The bolt 62 extends through the clevis 50 and through an anti-vibration bushing 60 which is provided at the inner end of the track arm 22. The anti-vibration bushing 60 is of the type illustrated in FIG. 7, which has an outer steel tube O, an inner steel tube I, and an elastomeric cylinder E between the outer and inner steel tubes which is vulcanized or otherwise securely attached to the outer surface of the inner tube and to the inner surface of the outer tube. The outer tube is welded to the plate-like beam 64 of the track arm 22. The bolts 44, 46, and 62 are shoulder bolts so as to provide pivotal connections at their points of attachment so that the upper and lower ends of the shock absorbers 18 and 20 are pivotally attached to the respective cab support 12 and foundation 14 and so that the inner end of the track arm 22 is pivotally attached to the foundation 14.

The far or outer end of the track arm 22 is affixed to the upper end of the air spring 16 by a disc-shaped plate 66 and tubular reinforcement 68 which are welded to the outer end of the beam 64 and to each other. A bolt (not shown) passes through the plate 66 inside the tube 68 to secure the top end of the spring 16. At a position which is between the ends of the track arm 22, preferably approximately halfway between where the arm 22 is affixed to the foundation 14 and where it is affixed to the air spring 16, the track arm 22 is pivotally connected to the cab support 12 by an anti-vibration bushing, similar to the anti-vibration bushing 60 at the inward end of the arm 22. The bushing 70 extends through and is welded to the beam 64 and a bolt 72 extends through holes in the legs of the cab support 12 and through the inner tube of the anti-vibration bushing 70 and is secured by a nut 73. The bolt 72 and nut 73 secure and establish a pivotal connection between the cab support 12 and the track arm 22.

A linkage arm 24 has its inner end secured to the clevis 50 by a bolt 76 and its outer end secured to the lower end of the front leg of the cab support 12 by bolt 78 so as to maintain the cab support 12 in the general orientation shown in FIG. 1, with the latch L opening upwardly. The linkage arm 24 provides for limited rotation of the cab support 12 about the axis of bolt 72 since its outer end is slotted at 80 so as to have a larger longitudinal (relative to the arm 24) dimension than the bolt 78 which extends through hole 80. In addition, elastomeric spacers 82 permit the relatively small pivoting and lateral translation required in the connections between the linkage arm 24 and the cab support 12 and clevis 50.

As is conventional in vehicle cab suspension systems which employ air springs, a height control valve 90 (FIGS. 3 and 6) is employed which pressurizes or depressurizes the spring 16 so as to maintain a certain average height of the rear of the cab. An air line (not shown) would be input to the valve 90 from the on-board vehicle air compressor and another air line (not shown) would run from the valve 90 to the air spring 16. The valve 90 is mounted to the mounting plate 40 and a connecting arm 92 has its lower end secured to a height control arm 94 of the valve 90. The upper end of the arm 92 is secured to the lower end of the rear leg of the cab support 12. Thus, the valve 90 is operated by the height of the cab support 12 to try to maintain the cab support 12, and therefore the cab, at the height illustrated in FIGS. 1 and 6.

A preferred embodiment of the invention has been described in considerable detail. Many modifications and variations to the preferred embodiment described will be apparent to those skilled in the art. For example, anti-vibration bushings are not necessary to practice the invention, but are desirable to attenuate the transmission of vibrations. Therefore, the invention should not be limited to the embodiment described, but should be defined by the claims which follow.

I claim:

1. In a vehicle cab suspension unit which supports a cab on a frame of a vehicle and has an air spring and at least one shock absorber, the improvement wherein said suspension includes an arm having one end pivotally connected to said frame, an opposite end supported by said air spring, and wherein said cab is supported by said arm at a position along said arm which is between said ends.

2. The improvement of claim 1, wherein said one end of said arm is pivotally connected to said frame by a bracket of said unit which is fixed to said frame of said vehicle.

3. The improvement of claim 2, wherein said bracket is mounted to an outer side frame rail of said frame.

4. The improvement of claim 1, wherein said one end of said arm is pivotally connected to said frame so as to pivot about a pivot axis which is longitudinally oriented relative to said vehicle in a fore and aft direction of said vehicle.

5. The improvement of claim 1, wherein said air spring of said unit is angled relative to a vertical direction.

6. The improvement of claim 5, wherein said air spring is angled in a lateral plane which is a plane which is perpendicular to the longitudinal direction of said vehicle.

7. The improvement of claim 1, wherein said cab is supported by said arm at a position along said arm which is between said ends of said arm by means of a latch which is releasably securable to said cab and is pivotally connected to said arm.

8. The improvement of claim 7, wherein said latch is pivotally connected to said arm by an anti-vibration bushing.

9. The improvement of claim 7, wherein a linkage arm maintains said latch in an orientation to engage with said cab when said cab is disengaged from said latch.

10. The improvement of claim 1, wherein said suspension unit has two shock absorbers, with one of said shock absorbers being positioned on each side of said arm.

11. The improvement of claim 1, wherein said shock absorber is angled in a lateral plane which is perpendicular to the longitudinal direction of said vehicle.

12. The improvement of claim 1, wherein said arm is pivotally connected to said frame by an anti-vibration bushing.

* * * * *